July 23, 1946.   R. F. MILLER   2,404,394
HEATING SHIELD FOR ALL TYPES OF AIRPLANE ENGINES
Filed July 9, 1945    3 Sheets-Sheet 1

Inventor
RUSSELL F. MILLER

By Ralph Chappell
Attorney

July 23, 1946.  R. F. MILLER  2,404,394
HEATING SHIELD FOR ALL TYPES OF AIRPLANE ENGINES
Filed July 9, 1945  3 Sheets-Sheet 2
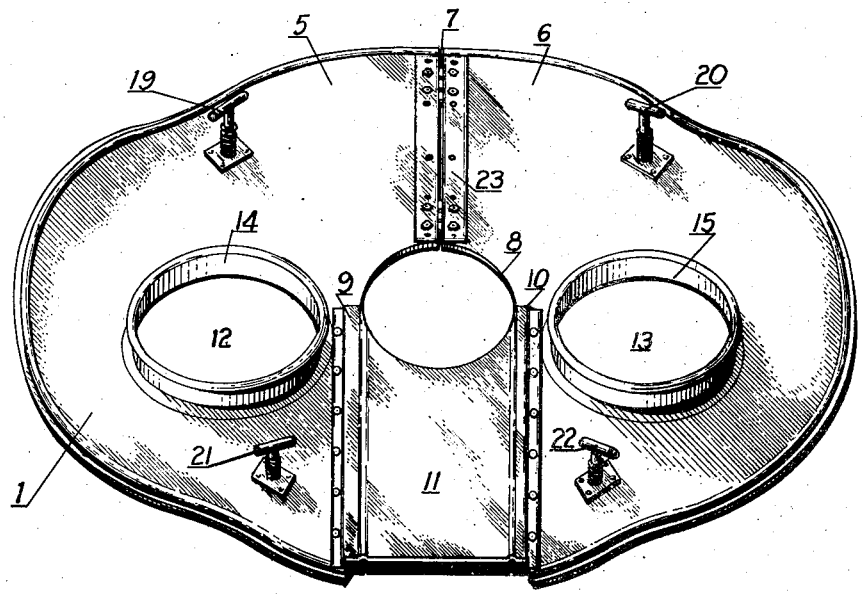
Fig. 2.
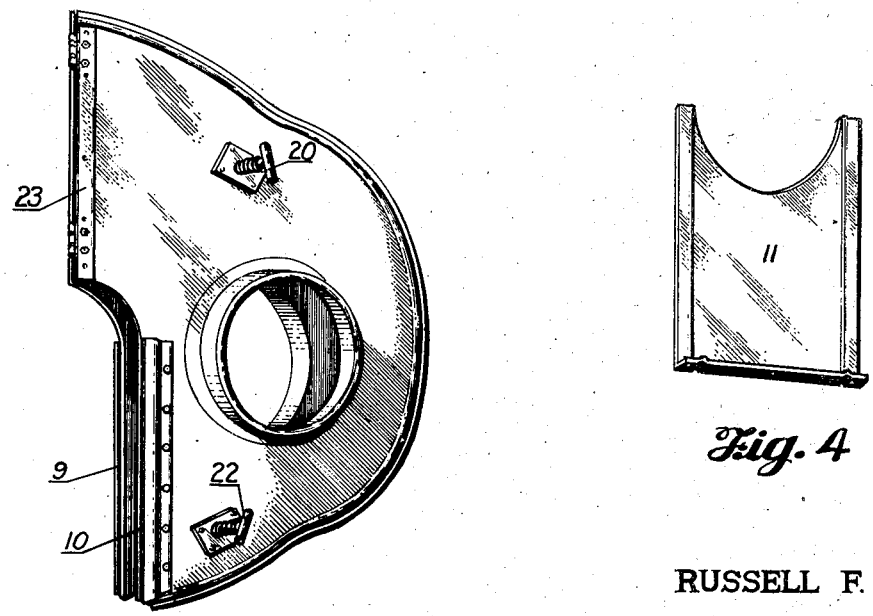
Fig. 3
Fig. 4
Inventor
RUSSELL F. MILLER
By Ralph Chappel
Attorney July 23, 1946.  R. F. MILLER  2,404,394
HEATING SHIELD FOR ALL TYPES OF AIRPLANE ENGINES
Filed July 9, 1945  3 Sheets-Sheet 3

Inventor
RUSSELL F. MILLER

Patented July 23, 1946

2,404,394

UNITED STATES PATENT OFFICE 2,404,394

HEATING SHIELD FOR ALL TYPES OF AIRPLANE ENGINES

Russell F. Miller, United States Navy

Application July 9, 1945, Serial No. 603,993

5 Claims. (Cl. 126—110)

(Granted under the act of March 3, 1883, as amended April 30, 1928; 370 O. G. 757)

This invention relates to shields for engines and particularly to removable heating shields to be carried as a part of the equipment in the aircraft for use in connection with any available hot air supply units for the purpose of warming up the engines preparatory to starting them in frigid weather, when starting from cold is difficult or impossible due to the difficulty of vaporizing the fuel in the engine and the difficulty of turning the engines over because of the increased viscosity of the lubricant.

Many devices have been used for prewarming engines for starting in cold weather, but they have usually been awkward and difficult to assemble, and not always available when needed.

The object of the present invention is to provide simple removable engine shielding means, to be carried as a part of the equipment in aircraft powered with internal combustion engines, which are apt to meet with frigid operating conditions, and which may have to be started after having been stopped for periods long enough to cool off to unusually low temperatures, producing difficult starting without some preliminary warming process.

Another object is to provide aircraft with simple easy-to-install engine shielding means, made to fit the opening at the front of the engine cowling, normally admitting the cooling airstream, all around the propeller shaft.

Another object is to construct an aircraft engine shield adapted for easy installation, to cover the opening, usually provided in front of the engine cowling for the cooling airstream, which shield may be quickly removed and folded for stowing away in the aircraft, and which has adaptor openings in it for connection to any available hot air supply means for warming up the engine prior to starting in cold weather.

Another object is to make the shield above referred to of a foldable sheet, cut in the shape of the airstream opening in front of the engine cowling, except for a strip the width of the propeller shaft and running from the propeller shaft opening down to the edge of the sheet, said sheet being hinged at the vertical axis above the shaft opening and having grooves along the sides of the opening below the shaft for reception of a corresponding sheet strip slidable thereinto from the bottom to cover the balance of the airstream opening and to stiffen the sheet against folding at the hinge, there being resilient locking means on the shield for connecting it to suitable parts of the engine for holding it in place, and shouldered adaptor openings in the shield for connection to hot air supply tubes for warming up the engine preliminary to starting it in cold weather.

Other and more specific objects will become apparent in the following detailed description of the invention, having reference to the accompanying drawings, wherein:

Fig. 2 shows the shield by itself, as it appears when assembled in place on the cowling;

Figs. 3 and 4 show its parts as they appear ready for stowing away;

Figure 1:
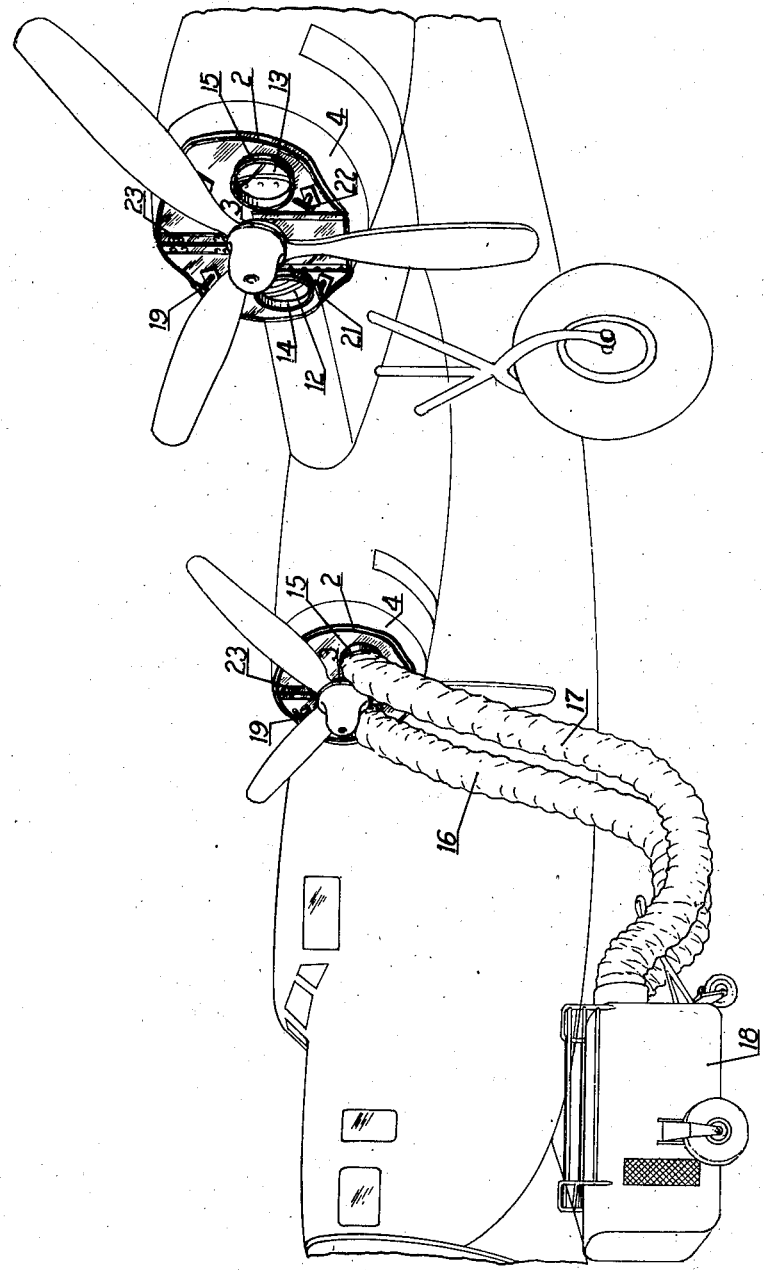
Fig. 1 shows an aircraft with engines of the radial type, to the engine cowlings of which one form of the present invention is applied.

Referring to the several figures in the drawings in which like parts are designated by the same numerals, the shielding means generally comprise a sheet 1 of material such as metal, metal with insulating lining or some stiff insulating material, etc., cut in the shape of the opening 2 around the propeller shaft 3 in front of the engine cowling 4 on which it is to be used. As shown in Figs. 1 to 4, this shielding means is designed for use on one type of radial aircraft engines and has two symmetrical portions 5 and 6 hinged at the symmetrical axis 7 above the propeller shaft opening 8, and cut away below the propeller shaft opening, to a width equal to at least the diameter of the propeller shaft opening. The sides of this cut away portion are provided with grooves 9 and 10 into which a correspondingly cut strip 11 of sheet material is fitted to slide, and to complete the shielding of the airstream opening around the propeller shaft. The two symmetrical portions 5 and 6 have openings 12 and 13 fitted with collars 14 and 15 for connection to hot air supply tubes 16 and 17 used in connection with a hot air supply means 18 for supplying the heat to the engine during the warming up process. Resilient locking means 19, 20, 21 and 22 are provided on these symmetrical portions for hooking them to parts of the engine so as to hold the assembly in place. The strip 11 which is slid into the grooves 9 and 10 at the sides of the cut away portion below the propeller shaft serves to stiffen the assembly and to prevent it from bending at the hinges 23. The sheet material making up the assembly is ribbed and/or crimped around the edges to stiffen the parts so that they may be made from comparatively thin sheet material and still have the required stiffness for holding their shape. The sheet material used in this construction may be metal, metal with insulating lining or coating, or just stiff sheets of insulating composition of any suitable type. It has been found practicable to use stainless steel or galvanized iron sheets .040 inch in thickness.

For each type of aircraft engine cowling, a shielding means may be designed in the same way, with appropriate locking means for hooking on to suitable parts of the engine in the particular type of construction.

Many modifications in the shape and dimensions of the parts of these shielding means might be made without departing from the spirit and scope of this invention, as defined in the appended claims.

Figure 5:
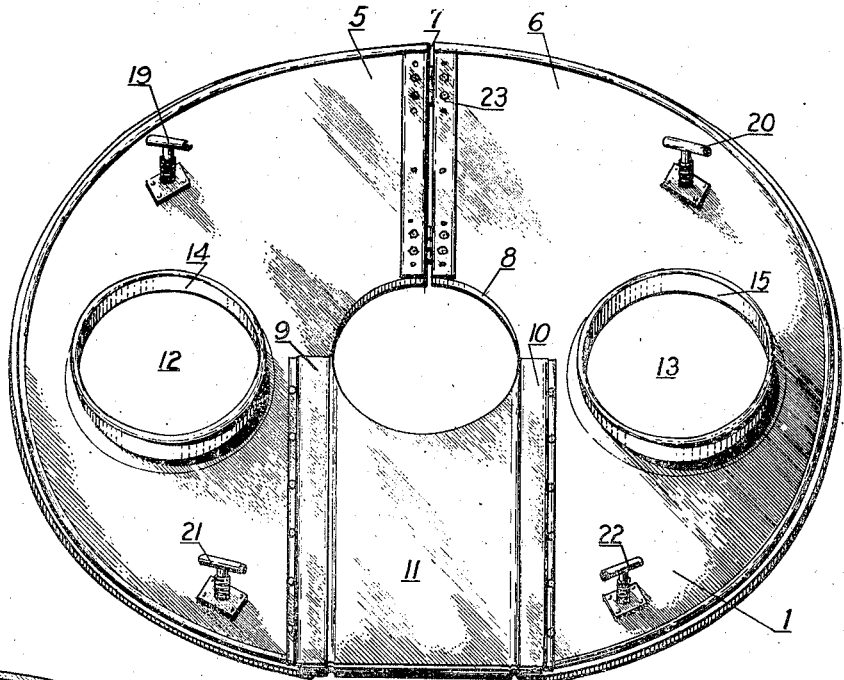
Fig. 5 shows a shield assembly for use on another engine unit.
Figure 6:
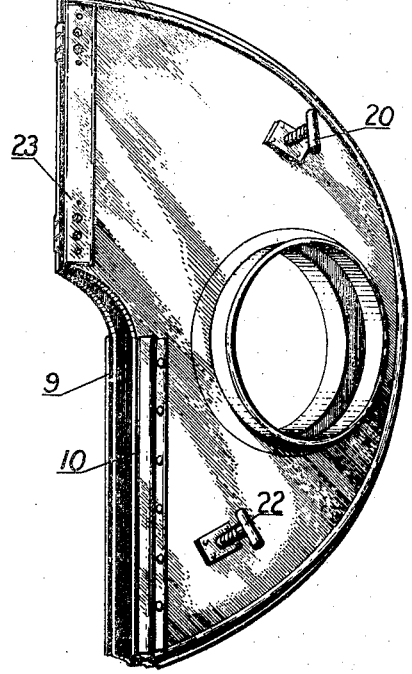
Figs. 6 and 7 are the parts of the above form, disassembled and folded, ready for stowing away.
Figure 7:
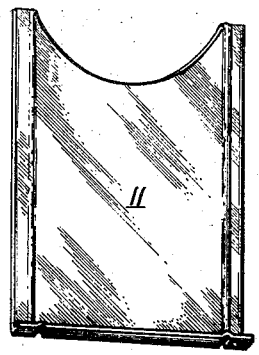

For example, Figs. 5 to 7 illustrate one other form of the shield means designed for use on a small engine unit, as installed on some other types of aircraft. The outline of this shield is practically circular and much smaller. The propeller shaft is comparatively small and requires only a very narrow cut away portion for the slidable strip 11 which fits in the grooves 9 and 10 and holds the two hinged portions 5 and 6 stiffly in extended position. The locking means 19, 20, 21, and 22 in this case are shaped in accordance with suitable projecting parts on the engine which is to be shielded.

The invention described herein may be manufactured and used by or for the Government of the United States of America for governmental purposes without the payment of any royalties thereon or therefor.

What is claimed is:

1. An aircraft engine shielding means for use in connection with engine heaters, comprising a sheet of material cut in the form of the airstream opening at the front of the engine cowling on which it is to be used and fitting over the propeller shaft by means of a cut away slot below the propeller shaft opening, means forming grooves along the sides of said slot, said sheet being formed of two parts, means hinging said parts together on the vertical axis above the propeller shaft opening, and a strip of sheet material fitted to slide in said grooves when the hinged parts are in place, to complete the closure of the airstream opening all around the propeller shaft, said shielding means having means forming shouldered openings for connection to heater tubes applied from the outside.

2. An aircraft engine shielding means for use in connection with engine heaters comprising a sheet of material cut in the form of the airstream opening at the front of the engine cowling on which it is to be used and fitting over the propeller shaft by means of a cut away slot below the propeller shaft opening, means forming grooves along the sides of said slot, and a strip of sheet material fitted to slide in said grooves to complete the closure of the airstream opening all around the propeller shaft, said shielding means having means forming shouldered openings adapted for connection with heat supply tubes.

3. An aircraft engine shielding means for use in connection with engine heaters comprising a sheet of material cut in the form of the airstream opening at the front of the engine cowling on which it is to be used and fitting over the propeller shaft by means of a cut away slot below the propeller shaft opening, means forming grooves along the sides of said slot, a strip of sheet material fitted to slide in said grooves to complete the closure of the airstream opening all around the propeller shaft, said shielding means having means for forming shouldered openings adapted for connection with heat supply tubes, and resilient locking means mounted on said sheet material for hooking onto projecting engine parts to hold the shield in place.

4. An aircraft engine shielding means for use in connection with engine heaters comprising a sheet of material cut in the form of the airstream opening at the front of the engine cowling on which it is to be used and fitting over the propeller shaft by means of a cut away slot below the propeller shaft opening, means forming grooves along the sides of said slot, a strip of sheet material fitted to slide in said grooves to complete the closure of the airstream opening all around the propeller shaft, said shielding means having means forming shouldered openings adapted for connection with heat supply tubes, and resilient locking means mounted on said sheet material for hooking onto projecting engine parts to hold the shield in place, said sheet material being crimped around its edges to stiffen the assembly.

5. An aircraft engine shielding means for use in connection with engine heaters comprising a sheet of material cut in the form of the airstream opening at the front of the engine cowling on which it is to be used and fitting over the propeller shaft with a cut away slot below the propeller shaft opening, means forming grooves along the sides of said slot, said sheet being formed of two parts, means hinging said parts together on the vertical axis above the propeller shaft opening, and a strip of sheet material fitted to slide in said grooves when the hinged parts are in place to complete the closure of the airstream opening all around the propeller shaft and to stiffen the assembly against bending at the hinge, said shielding means having means forming shouldered openings for connection to heat supply tubes applied from the outside for heating the engine preparatory to starting in cold weather.

RUSSELL F. MILLER.